United States Patent [19]

Lange

[11] 3,945,959

[45] Mar. 23, 1976

[54] OIL MODIFIED IMIDIZED POLYESTER RESINS

[75] Inventor: Daniel J. Lange, St. Louis, Mo.

[73] Assignee: The P. D. George Co., St. Louis, Mo.

[22] Filed: July 17, 1974

[21] Appl. No.: 489,382

[52] U.S. Cl. ............ 260/20; 260/22 R; 260/22 CQ; 260/22 TN; 428/458
[51] Int. Cl.².... C09D 3/56; C09D 3/64; C09D 3/66
[58] Field of Search .. 260/22 CQ, 22 TN, 20, 75 N, 260/850; 117/132 B, 132 BF, 128, 4, 232

[56] References Cited
UNITED STATES PATENTS

| | | | |
|---|---|---|---|
| 3,297,785 | 1/1967 | George et al. | 260/850 |
| 3,312,645 | 4/1967 | George et al. | 260/22 CQ |
| 3,342,780 | 9/1967 | Meyer et al. | 260/75 N |
| 3,426,098 | 2/1969 | Meyer et al. | 260/850 |
| 3,544,496 | 12/1970 | Formaini | 260/22 TN |
| 3,632,837 | 1/1972 | Kolyer et al. | 260/857 R |
| 3,759,853 | 9/1973 | Formaini et al. | 260/22 CQ |
| 3,763,269 | 10/1973 | Formaini | 260/75 N |
| 3,859,284 | 1/1975 | Formaini et al. | 260/20 |

*Primary Examiner*—Ronald W. Griffin
*Attorney, Agent, or Firm*—Sidney B. Ring; Hyman F. Glass

[57] ABSTRACT

This invention relates to oil modified imidized polyester resins containing isocyanurates of the formula

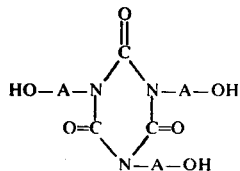

where A is alkylene and preferably ethylene (THIC); and to electrical insulating compositions derived therefrom, particularly those electrical varnishes containing oil soluble resins, such as phenol-aldehyde resins, which possess improved thermal stability.

40 Claims, No Drawings

OIL MODIFIED IMIDIZED POLYESTER RESINS

In U.S. Pat. No. 3,312,645 issued Apr. 4, 1967 there is described and claimed oil modified polyester resins containing THIC; and electrical insulating varnishes derived therefrom, particularly those electrical varnishes containing oil soluble resins such as phenol-aldehyde resins.

I have now discovered that oil modified imidized polyester resins containing THIC and electrical insulating compositions derived therefrom, particularly those electrical varnishes containing oil soluble resins such as phenol-aldehyde resins, are superior to the corresponding oil modified polyester resins containing THIC and electrical insulating varnishes derived therefrom, particularly as to high temperature stability.

In general, the oil modified imidized polyester resins are prepared in the manner of U.S. Pat. No. 3,312,645 except that tricarboxylic acids and polyamines are employed in the preparation thereof so as to impart imide groups to the final resin in addition to polyester groups. Thus, any of the procedures and formulations of U.S. Pat. No. 3,312,645 can be employed provided tricarboxylic acid and polyamines are employed in the preparation. In general, the tricarboxylic acid and polyamine comprises about 50% equivalent or less of the resin, such as 50% to 2.5% equivalent, for example about 40% to 10% equivalent, with an optimum of about 15%.

Although alcoholic compounds such as glycols and polyols may be employed in addition to THIC, in the preferred embodiment no glycols or polyols apart from that derived from the oil is employed. Stated another way, in the preferred embodiment THIC is the sole alcoholic moiety.

In the preferred embodiment, the oil modified polyester formulation of U.S. Pat. No. 3,312,645 can be converted to the oil modified polyester resins of the present invention by about a 15% equivalent imide modification in the basic oil modified polyester resin. Stated another way, by replacing about 15% equivalent of the dicarboxylic acid employed with about 10% equivalent of the tricarboxylic acid and 5% equivalent of the diamine so that about 15% equivalent of said reactants yield the following idealized imidized structure

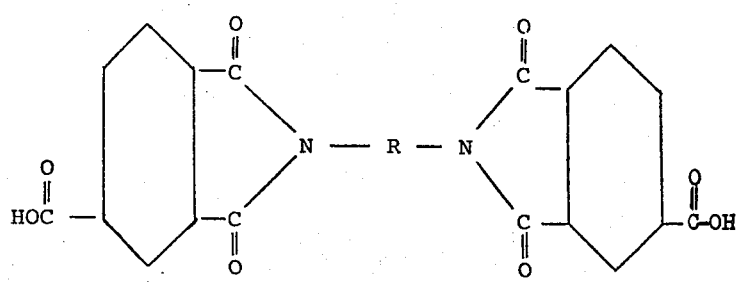

which replaces about 10% equivalent dicarboxylic acid and about 5% equivalent THIC.

As a rule of thumb, without changing the oil length, the formulations described in U.S. Pat. No. 3,312,645 can be imidified by replacing about 15% equivalent of the dicarboxylic with about 10% equivalent of the tricarboxylic acid and replacing 5% equivalent of THIC with 5% equivalent of the diamine.

In the preferred embodiment, the % equivalent ratio of TMA to Diamine is preferably about 2 to 1. Where excess Diamine is used, amido groups as well as imido groups are also formed.

The term "imidized" as employed herein means containing an imido structure idealized as

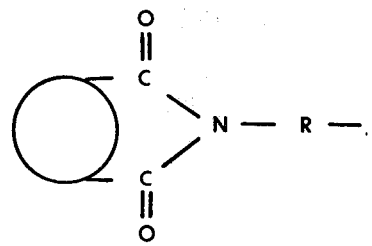

where ◯ is the moiety of the tricarboxylic acid or anhydride, preferably an aromatic gorup such as a phenyl group, and R is the moiety of the diamine, preferably where R is an aromatic moiety such as a phenyl group such as

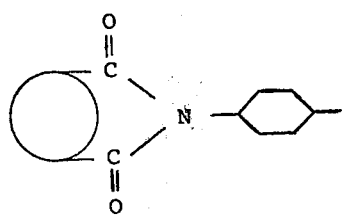

preferably where R is phenyl. In the idealized presentation the structure is

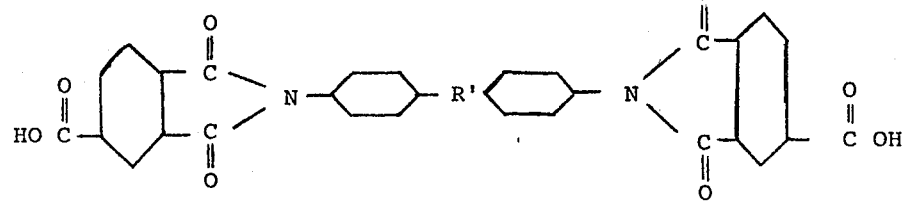

where R' is defined herein in relation to the diamine. This is prepared by reacting 2 molar ratios of TMA with 1 molar ratio of the diamine.

Although the imide structure is idealized, the term imidized does not preclude the presence of amido groups formed by reaction of the carboxylic acid groups with the diamine. Stated another way, although imidized relates primarily to the formation of imide groups by reaction of diamine with the tricarboxylic acid anhydride, the presence of excess diamine can also yield amido groups, for example

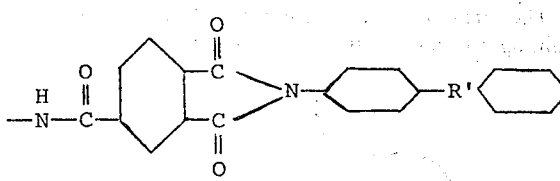
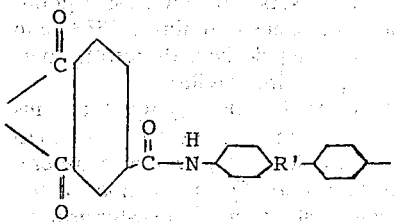

The organic diamines usable in this invention are those having the structural formula $H_2N—R'—NH_2$, wherein R', a divalent radical containing at least 2 carbon atoms, may be aromatic, aliphatic, cycloaliphatic, a combination of aromatic and aliphatic or substituted groups thereof, etc. The most useful diamines are the primary diamines which, upon reaction with the trifunctional acids may provide imido groups. The preferred R' groups in these diamines are those containing at least six carbon atoms and characterized by benzenoid unsaturation. More specifically these groups are:

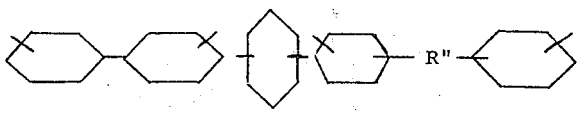

and the like, where R'' is a carbon-, nitrogen-, oxygen-, silicon-, phosphorus-, or sulphur containing group.

Amone the diamines which are suitable for use in the present invention are:

4,4'-diamino-diphenyl propane;
4,4'-diamino-diphenyl methane;
3,3'-dichloro-benzidine;
4,4'-diamino-diphenyl ketone;
3,3'-diamino-diphenyl ketone;
4,4'-diamino-diphenyl sulfide;
3,3'-diamino-diphenyl sulfone;
4,4'-diamino-diphenyl sulfone;
4,4'-diamino-diphenyl ether;
1,5-diamino-naphthalene;
meta-phenylenediamine;
para-phenylene-diamine;
3,3'-dimethyl-4,4'-biphenyl diamine;
3,3'-dimethoxy benzidine;
 bis(beta-amino-t-butyl) toluene;
bis-(para-beta-amino-t-phenyl) ether;
bis-(para-beta-methyl-delta-amino-pentyl) benzene;
bis-para-(1,1-dimethyl-5-amino-pentyl) benzene;
1-isopropyl-2,4-metaphenylene diamine;
m-xylylene diamine;
p-xylylene diamine;
di(para-amino-cyclohexyl) methane;
hexamethylene diamine;
heptamethylene diamine;
octamethylene diamine;
nonamethylene diamine;
decamethylene diamine;
diamino-propyl tetramethylene diamine;
3-methylheptamethylene diamine;
4,4-dimethylheptamethylene diamine;
2,11-diaminododecane;
1,2-bis-(3-amino-propoxy) ethane;
2,2-dimethylpropylene diamine;
3-methoxy-hexamethylene diamine;
2,5-dimethylhexamethylene diamine;
2,5-dimethylheptamethylenediamine;
3-methylheptamethylene diamine;
5-methylnonamethylenediamine;
2,11-diamino-dodecane;
2,17-diamino-eicosadecane;
1,4-diamino-cyclohexane;
1,10-diamino-1,10-dimethyl decane;
1,12-diamino-octadecane;
$H_2N(CH_2)_3O(CH_2)_2O(CH_2)_2NH_2$;
$H_2N(CH_2)_3S(CH_2)_3NH_2$;
$H_2N(CH_2)_3N(CH_3)(CH_2)_3NH_2$;

piperazine. A plurality of the above polyamines can also be employed, for example 2,3,4 or more of these amines, in preparing the resin.

The tricarboxylic acid is characterized by the formula

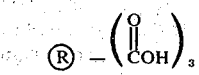

where at least two acid groups are capable of imidization and where Ⓡ is a moiety of the acid.

Although trimellitic acid or its anhydride (TMA) is the preferred embodiment, other suitable tricarboxylic acids or anhydrides can also be employed, for example:

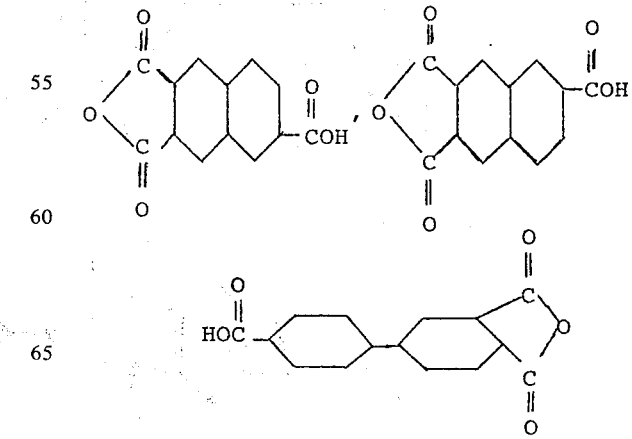

or isomers thereof,

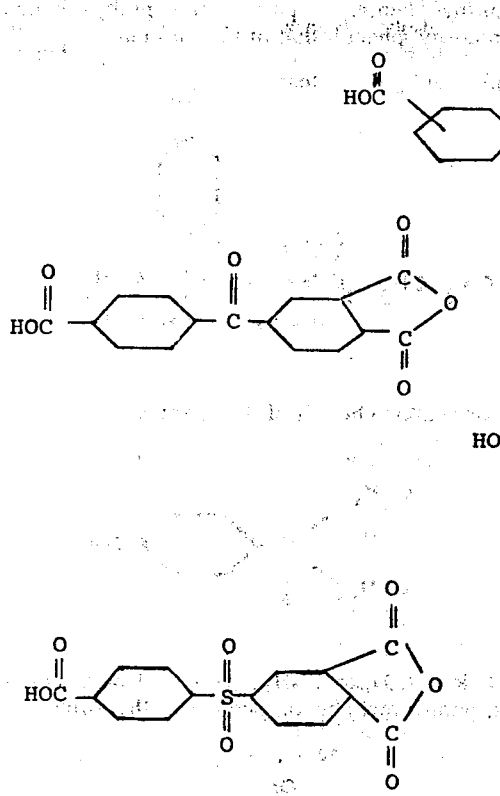

and the like.

Aromatic tricarboxylic acids are preferred.

Representative fatty oils which may be used in the present invention include the non-drying, semi-drying, and drying fatty oils, including vegetable oils and animal oils, marine oils and treated marine oils, such as soya, cottonseed, hydrogenated cottonseed, linseed, castor, hydrogenated castor, dehydrated castor, cocoanut, tung, oiticica, menhaden, hempseed, grapeseed, corn, cod-liver, candlenut, walnut, perilla, poppyseed, safflower, conjugated safflower, sunflower, rapeseed, China-wood, tristearin, whale, sardine, herring, etc., oils. Instead of using these oils, it should be understood that for the purposes of the present invention fatty acids or mixtures of fatty acids which make up the fatty oils or their equivalents can be employed.

Representative monocarboxylic acids, including fatty acids may be illustrated by the following: abietic acid, benzoic acid, caproic acid, caprylic acid, castor fatty acid, cocoanut fatty acid, cottonseed fatty acid, crotonic acid, DCO FA, i.e. primarily $$CH_3(CH_2)_5CH = CH - CH = CH - (CH_2)_7COOH$$

2-ethyl hexoic acid, lauric acid, linoleic acid, linolenic acid, linseed FA, oleic acid, pelargonic acid, rosin acid (A.N. 165), soya FA, tall oil FA (A.N. 195, A.N. 192), etc.

Percentage oil length normally refers to the oil portion of the resin expressed as a percentage of the total weight of the finished resin. It is equal to the weight of any fatty acid in the resin taken together with the weight of a polyol needed to completely esterify this fatty acid (minus weight of evolved water of esterification) expressed as a percentage of the total solids content of the finished resin.

Thus, where a fatty acid is present in the formulation, its oil length is calculated as a fully esterified ester of the polyol. For example, where THIC, a fatty acid, such as tall oil FA, and a polycarboxylic acid, such as a phthalic acid, are the sole reactants, the oil length of the formulation is as follows:

Percent oil length =

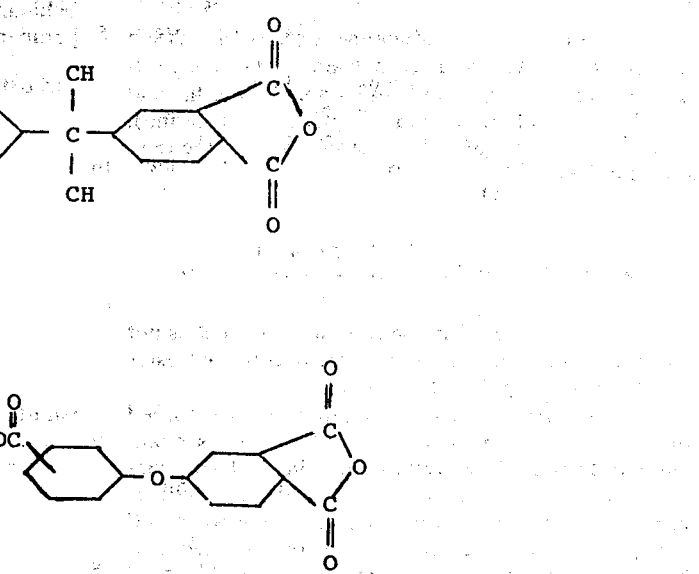

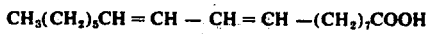
Total weight of resin formulation where R represents the tall oil FA moiety.

Where an oil is employed, the oil length is calculated as follows:

$$\text{Percent oil length} = \frac{\text{Wt. fatty acid glyceride (or oil)}}{\text{Total resin weight}} = 100$$

Where less than a full glyceride is employed, for example a mono- or a di-glyceride, the oil length is calculated as the full glyceride produced during esterification.

Thus, in the preferred embodiment where in addition to tricarboxylic acid and the polyamine the sole reactants are THIC, a fatty acid, and a polycarboxylic acid (i.e. the formulation contains no glycol or glycerine), the oil length is calculated as the full ester of the fatty acid and THIC

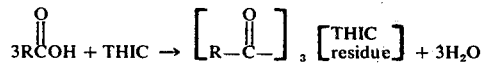

The remaining THIC in the formulation which is not part of the fatty acid ester is calculated as the polyester of THIC and the polycarboxylic acid.

Thus, for purposes of this invention an oil modified imidized polyester includes imidized polyesters modified with fatty acids as well as oils. The preferred embodiment of this invention is an imidized polyester resin prepared from a fatty acid, i.e. a polyester containing no glycol or glycerine. The oil-modified imidized polyesters may be of long, medium or short oil content, but is preferably of long oil content; where a fatty acid is employed, it may also be long, medium or short, i.e. having proportionate ranges of fatty acids calculated as glycerides and/or isocyanurates as compared to the oils. These terms have the following meanings: Short oil 30–45%; medium oil 45–55%; long oil 55–78%, weight of oil based on total weight of the imidized polyester formulation including the oil. Lesser amounts of oil such as 25% or lower, or greater amounts of oil, such as 75–80% or greater, may also be employed in certain instances.

The oil modified imidized polyester resins of this invention can be further modified by employing various resins in conjunction therewith.

Included among such resins are phenol-aldehyde resins, phenol-sulfur resins, phenol-acetylene resins, including resins produced from phenol and substituted phenols, including difunctional, trifunctional and tetrafunctional phenols, naphthols, bisphenols, salicylic acid and salicylates, etc., modified phenolic resins, including phenol-terpene resins, phenol-terpene-aldehyde resins, phenol-naphthalene-aldehyde resins, phenol-urea-formaldehyde resins, phenol-aniline-formaldehyde resins, phenol-glycerol resins, etc., non-phenolic resins having the necessary labile or reactive hydrogen including urea and substituted urea-aldehyde resins, sulfonamide-aldehyde resins, melamine-aldehyde resins, polycarboxy-polyamine resins, resins derived by ring hydrogenation of phenolic resins, and the like.

Suitable resins can be prepared from difunctional phenols and aldehydes. For the preparation of such resins, suitable phenols include: Para- and ortho-cresols; para- and ortho-ethyl-phenol; 3-methyl-4-ethyl-phenol; 3-methyl-4-propyl-phenol; 2-ethyl-3-methyl-phenol; 2-propyl-3-methyl-phenol; para- and ortho-propyl-phenol; para-tertiary-butylphenol; para-secondary-butylphenol; para-tertiary-amyl-phenol; para-secondary amyl-phenol; para-tertiary-hexyl-phenol; paraisooctyl-phenol; ortho-phenyl-phenol; para-phenyl-phenol; thymol; ortho-benzyl-phenol; para-benzyl-phenol; para-cyclohexyl-phenol; para-tertiary-decyl-phenol; para-dodecyl-phenol; para-tetrade-cyl-phenol; para-octadecyl-phenol; para-nonylphenyl; para-methyl-phenol; para-eicosanyl-phenol; paradocosanyl-phenol; para-tetracosanyl-phenol; para-betanaphthyl-phenol; para-alpha-naphthyl-phenol; parapentadecyl-phenol; that of the formula

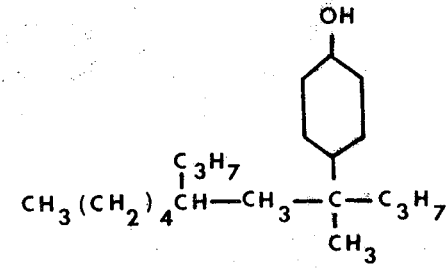

para-tertiary-alkyl-phenols of the formula

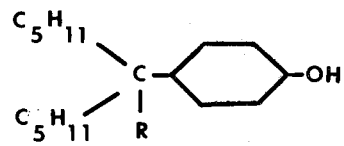

in which R is $C_9H_{19}$ to $C_{13}H_{27}$; para- and ortho-cetyl-phenols; para-cumyl-phenol; phenols of the formula

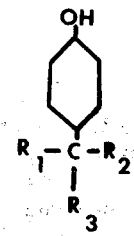

in which $R_1$ represents a straight chain hydrocarbon radical containing at least 7 carbon atoms and $R_2$ and $R_3$ represent hydrocarbon radicals the total number of carbon atoms attached to the tertiary carbon being at least 11; and phenols of the formula

in which $R_1$ represents an alkyl hydrocarbon radical containing at least 7 carbon atoms in a straight chain and $R_2$ represents an alkyl hydrocarbon radical containing at least 2 carbon atoms, the total number of carbon atoms in $R_1$ and $R_2$ being at least 11; and the corresponding ortho-para substituted metal-cresols, and 3,5-xylenols; the alkyl salicylates, including methyl salicylate, butyl salicylate, amyl salicylate, octyl salicylate, nonyl salicylate, dodecyl salicylate; benzyl salicylate; cyclohexyl salicylate; oleyl salicylate; styryl salicylate; phenoxy ethyl salicylate; p-hydroxy-ethyl-benzoate; salicylic acid; n-chlorophenol; o-chlorophenol; o- and p-dimethylaminomethyl-phenol; p-pentenyl-phenol; guaiacol; catechol; p-phenoxyphenol; p-hydroxybenzophenone; hydroxyphenylheptadecyl ketone; hydroxyphenylheptadecenyl ketone; hydroxyphenylundecyl ketone; beta-naphthol; methyl naphthol; and carvacrol.

For the production of aldehyde-linked resins, including not only those derived from difunctional phenols, but also those derived from trifunctional and tetrafunctional phenols (e.g. bis-phenols) and modified phenolic resins involving aldehyde-derived bridges, any aldehyde capable of forming a methylol or a substituted methylol group and having not more than 8 carbon atoms is satisfactory, so long as it does not possess some other functional group or structure which will conflict with the resinification reaction but the use of formaldehyde, in its cheapest form of an aqueous solution, for the production of the resins is particularly advantageous.

Useful aldehydes, in addition to formaldehyde, are acetaldehyde, propionaldehyde, butyraldehyde, 2-ethylhexanal, ethylbutyraldehyde, heptaldehyde, and benzaldehyde, furfural and glyoxal.

The compositions of this invention can be employed to prepare insulating varnishes and in particular varnishes yielding electrical conductor coatings have improved properties. These varnishes are particularly valuable for impregnating armature and field coils of motors and for both power and distribution transformers of either the oil or dry type where long life at high operating temperatures is required. These varnishes provide maximum penetration in the tightest wound coils. They are particularly suitable for impregnating motor stators, rotors and other electrical equipment.

In preparing the insulating varnishes of the present invention, in addition to the oil modified imidized polyester resins there is normally used an oil-soluble phenol-aldehyde resin. The phenol-aldehyde resin gives the varnish heat reactivity, improves electrical properties, aids in the cure and lends hardness and abrasion resistance to the product. Among the oil-soluble phenol-aldehyde resins which can be used are p-tertiary amylphenol-formaldehyde, p-tertiary butylphenol-formaldehyde, p-tertiary octylphenolformaldehyde, p-phenylphenol-formaldehyde, 2,2-bias(p-hydroxyphenyl) propane-formaldehyde and o-tertiary butylphenol-formaldehyde. Other suitable phenol-formaldehyde resins are shown in Honel U.S. Pat. No. 1,800,296. Substituted phenols alone or in conjunction with phenols can be used in forming the oil-soluble phenolic resin. While the phenolic resin can be prepared using an acid catalyst, they are generally prepared using alkaline catalysts as is well known in the art. Thus, the p-tertiary butylphenolformaldehyde resin employed may be prepared by the alkaline (NaOH) catalyzed reaction of 1 mol of the phenol with 1.5 mols of formaldehyde. A typical example of a mixed phenolic resin which can be used is the alkaline (NaOH) catalyzed reaction product of 0.75 mol of p-tertiary butylphenol and 0.25 mol of bisphenol A with 1.5 mols of formaldehyde. The oil-soluble phenol-formaldehyde resins are of the heat-reactive type. The oil-soluble phenol-formaldehyde resin is usually employed in an amount of 10% to 80% by weight of the total of the oil modified polyester and phenolic resin, such as 15–40%, but preferably 20–30%. Increasing the amount of phenolic resin speeds the cure but also sacrifices ageing characteristics. Hence, the amount of phenolic resin is preferably kept at about 20% by weight. It is also possible to eliminate the phenolic resin from the varnish with resulting loss of the advantages from having the phenolic resin present. It is also possible to replace part of the phenolic resin with other heat-reactive resins, e.g., furane resins, triazine resins, urea-formaldehyde, melamine-formaldehyde and epoxy resins, e.g., bisphenol A-epichlorohydrin resin, although the preferred heat-reactive resins are the phenolic resin since they impart the best combination of improved properties, all things considered. Rosin-modified phenolics are also advantageously employed.

In addition to the resin components, the insulating varnish also includes one or more solvents, such as xylene, mineral spirits, isophorone, maphtha, toluene, etc., including the Los Angeles "Rule 66" type solvents, and other non-polluting solvents.

The insulating varnishes of the instant invention have properties which warrant their use at class H temperatures. They can withstand temperatures in excess of 180°C. for the normal life of a motor or transformer in which they are utilized. The cured varnishes are highly resistant to oil, chemicals and moisture.

The varnishes in accelerated ageing tests have retained their toughness, flexibility, excellent bonding strength and high dielectric properties after heat ageing for as long as 20,000 hours at over 200°C., based on extrapolated values. The varnishes can be applied by vacuum impregnation or free dip system. They cure readily under infra-red heat or in forced air ovens. Baking is normally done at 375°F. to 400°F., although lower temperatures can be used.

A typical insulating varnish is prepared by formulating the imidized polyester of this invention with a phenolic resin, usually in a dilute solution for example from about 25–75% solids, but preferably as a 50% solution. Other conventional additives can be employed, for example a drier or curing agent may be employed, for example manganese, zinc, lead, titanium, cadmium, boron, thorium, etc., salts, such as the naphthenates, octoates, tolates, etc., thereof, for example in ratios of 1–10 parts or more of drier per 1000 parts by weight of imidized polyester resin.

The following examples are presented by way of illustration and not of limitation.

EXAMPLE 1

The following composition was prepared according to the process of Example 4 of U.S. Pat. No. 3,312,645 as a typical oil modified polyester resin except that all reactants were added as the initial charge.

| Tall Oil Fatty Acid | = 21.3 equivalents |
|---|---|
| THIC | = 51.1 equivalents |
| Isophthalic Acid | = 27.6 equivalents |

Temperature of reaction 490°–500°F. Final Viscosity Gardner-Holdt T-U (50% mineral spirits). Final Acid No. > 10.

EXAMPLE 1A

The product of Example 1 was mixed with phenolic resin in the following ratio:

| | Parts by weight |
|---|---|
| Oil Modified Polyester resin Ex. 1 | 1000 |
| Phenolic Resin | 183 |

The above is employed as a 50% solution containing the above solids.

The phenolic resin employed herein was prepared in the conventional manner from the following:

| | Moles | Parts by Weight |
|---|---|---|
| p-Tertiary butyl phenol | 6.75 | 1,012.5 |
| Phenol | 2.00 | 188.0 |
| Paraformaldehyde | 1.625 | 488.00 |
| Water | | 650.00 |
| NaOH (50% aqueous solution) | | 124.00 |
| 30% HCl to neutralize after reaction | | 161.00 | p-Tertiary butyl phenol, phenol, paraformaldehyde, water and NaOH are heated to 212°–220°F. and held for ½ hour. This product neutralized to a pH of 4.5–5.5 with the HCl is then dehydrated. It has a viscosity of A-D (Gardner-Holdt) as a 50% xylol solution.

EXAMPLE 2

The imidized version of example 1 was prepared according to the following formula to yield an oil modified imidized polyester resin.

| Tall Oil Fatty Acids | 21.0% equivalents |
|---|---|
| THIC | 48.0% equivalents |
| Isophthalic Acid | 16.0% equivalents |
| Methylene dianiline (MDA) | 5.0% equivalents |
| Trimellitic Anhydride (TMA) | 10.0% equivalents |

The procedure was that of Example 1 except that the formulation was modified as shown to employ trimellitic anhydride and methylene dianiline. the formulation wzs modified as shown to employ trimellitic anhydride and methylene dianiline. MDA + TMA were included with the initial charge. Viscosity Gardner-Holdt T-U (50% mineral spirits) Final Acid No. < 10.

EXAMPLE 2A

The procedure of example 1A was followed except that the imidized polyester of example 2 was employed, employing the same phenolic resin and thinned with the same solvent to the same solids content.

Weight losses for the varnishes at high temperature were run by comparing the varnish of example 1A (polyester base) with the varnish of example 2A (imidized polyester base). The procedure was as follows:

Ten grams of each varnish were weighed into weighed aluminum cups, baked at 420°C. over a period of 7 hours and reweighed each hour over a period of seven hours to give the following results reported as the percent of solids remaining:

| Oil Modified Polyester Base (Ex. 1A) Varnish | Oil Modified Imidized Polyester Base (Ex. 2A) Varnish |
|---|---|
| 91.6 up to 1 hr. | 94.8 up to 1 hr. |
| 69.8 after 1 hr. | 88.0 after 1 hr. |
| 61.4 after 2 hrs. | 83.4 after 2 hrs. |
| 49.2 after 3 hrs. | 79.8 after 3 hrs. |
| 41.8 after 4 hrs. | 76.6 after 4 hrs. |
| 39.4 after 5 hrs. | 74.0 after 5 hrs. |
| 36.6 after 6 hrs. | 71.8 after 6 hrs. |
| 33.6 after 7 hrs. | 70.4 after 7 hrs. |

From the above tests, the thermal stability of the oil modified imidized polyester varnish was more stable than the corresponding polyester varnish by a factor of greater than 2.

The oil modified imidized polyester can also be employed as wire enamels.

The ratio of reactants can vary widely, for example:

| Reactant | Broad Range % Equivalents | Intermediate Range % Equivalents | Preferred Range % Equivalents |
|---|---|---|---|
| Oil, preferably Fatty Acids | 5–40 | 15–30 | 20–25 |
| Dicarboxylic acid, preferably iso- or tere-phthalic acid | 5–30 | 10–25 | 15–20 |
| Polyol, preferably THIC | 30–65 | 40–55 | 45–50 |
| Tricarboxylic acid, preferably TMA | 1.3–34 | 4–16 | 9–11 |
| Diamine Preferably 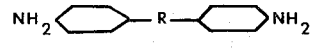 R as defined herein | .65–17 | 2–8 | 4.5–5.5 |

In summary, the present invention relates to the oil modified polyesters of U.S. Pat. No. 3,312,645 where the dicarboxylic acid and polyol, such as phthalic acid and THIC, have been replaced in part by the imidizing groups, i.e., tricarboxylic acid and diamine, such as TMA and

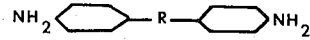

such as with 5–50% and preferably about 10–25% equivalent with an optimum of about 15% of the imidizing groups. The percent equivalents ratio of TMA to Diamine is preferably about 2 to 1.

U.S. Pat. No. 3,312,645 is by reference incorporated into this application as if part hereof, with the clear understanding that the teachings and formulations disclosed therein can be imidized in accord with the above teachings. The imidized oil modified polyester resins of the present invention can be employed in all the applications of U.S. Pat. No. 3,312,645, except that they possess greater heat stability.

Although the utility of the oil modified imidized polyester resins of this invention has been described principally in terms of electrical applications, it should be understood that these resins may be used in all of the other applications suitable for synthetic resins. Thus, these resins can be employed in protective coating applications by applying the resin in a suitable solvent to a surface by brushing or spraying with subsequent curing. When used as a protective coating, these resins have outstanding resistance to weathering and do not discolor after extended exposure to elevated temperatures. These resins can also be employed in protective coating applications by applying the resin in a suitable solvent to a surface by brushing or spraying with subsequent curing. These resins can also be employed in varnish and paint formulations. These resins can also be used in molding powder formulations by mixing them with various fillers such as wood flour, diatomaceous earth, carbon, silica, etc. These resins are also useful as impregnants and as bonding materials for metallic and fibrous laminates. They are useful as coatings for tapes, glass cloth, fabrics, paper, as mica binders, as asbestos binders, as electrical tubing and sleaving varnishes, as a laminating varnish, etc.

In addition to the use of phenol-aldehyde resins the resins of the present invention may be mixed and cured with other resins such as melamine-formaldehyde resins, epoxide resins such as the reaction product of epichlorohydrin and bis-phenol-A, aniline-formaldehyde resins, urea-formaldehyde resins, cellulose acetate resins, polyamide resins, vinyl resins, ethylene resins, styrene resins, butadiene-styrene resins, etc., or any of the other resins specified herein.

I claim:

1. An oil-modified imidized polyester resin of polyester of
   I. an isocyanate of the formula

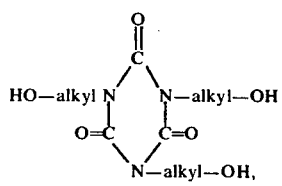

II. a phthalic acid,
   III. a member selected from the group consisting of (1) fatty acids, (2) fatty oils, (3) mono- and diglycerides of the fatty acids and (4) mixtures thereof, and
   IV. an aromatic tricarboxylic acid and a diamine capable of reacting with each other to form an imide,
   the isocyanurate being the sole polyol component present in the polyester apart from that occurring in the component (III), there being no other polymer forming components in the said resin other than those selected from the above named components.

2. The resin of claim 1 where the isocyanurate is tris(hydroxyethyl) isocyanurate.

3. The resin of claim 2 where the phthalic acid is isophthalic, terephthalic acid or mixtures thereof.

4. The resin of claim 3 where tris(hydroxyethyl) isocyanurate is the sole alcoholic moiety employed.

5. The resin of claim 4 where the component III is a fatty acid.

6. The resin of claim 1 where the component IV of the resin is trimellitic acid or trimellitic anhydride and an aromatic diamine.

7. The resin of claim 2 where the component IV of the resin is trimellitic acid or trimellitic anhydride and an aromatic diamine.

8. The resin of claim 3 where the component IV of the resin is trimellitic acid or trimellitic anhydride and an aromatic diamine.

9. The resin of claim 4 where the component IV of the resin is trimellitic acid or trimellitic anhydride and an aromatic diamine.

10. The resin of claim 5 where the component IV of the resin is trimellitic acid or trimellitic anhydride and an aromatic diamine.

11. A composition comprising the resin of claim 1 with a phenol-aldehyde resin.

12. A composition comprising the resin of claim 2 with a phenol-aldehyde resin.

13. A composition comprising the resin of claim 3 with a phenol-aldehyde resin.

14. A composition comprising the resin of claim 4 with a phenol-aldehyde resin.

15. A composition comprising the resin of claim 5 with a phenol-aldehyde resin.

16. A composition comprising the resin of claim 6 with a phenol-aldehyde resin.

17. A composition comprising the resin of claim 7 with a phenol-aldehyde resin.

18. A composition comprising the resin of claim 8 with a phenol-aldehyde resin.

19. A composition comprising the resin of claim 9 with a phenol-aldehyde resin.

20. A composition comprising the resin of claim 10 with a phenol-aldehyde resin.

21. An electrical conductor insulated with the composition of claim 1.

22. An electrical conductor insulated with the composition of claim 2.

23. An electrical conductor insulated with the composition of claim 3.

24. An electrical conductor insulated with the composition of claim 4.

25. An electrical conductor insulated with the composition of claim 5.

26. An electrical conductor insulated with the composition of claim 6.

27. An electrical conductor insulated with the composition of claim 7.

28. An electrical conductor insulated with the composition of claim 8.

29. An electrical conductor insulated with the composition of claim 9.

30. An electrical conductor insulated with the composition of claim 10.

31. An electrical conductor insulated with the composition of claim 11.

32. An electrical conductor insulated with the composition of claim 12.

33. An electrical conductor insulated with the composition of claim 13.

34. An electrical conductor insulated with the composition of claim 14.

35. An electrical conductor insulated with the composition of claim 15.

36. An electrical conductor insulated with the composition of claim 16.

37. An electrical conductor insulated with the composition of claim 17.

38. An electrical conductor insulated with the composition of claim 18.

39. An electrical conductor insulated with the composition of claim 19.

40. An electrical conductor insulated with the composition of claim 20.

* * * * *